(12) United States Patent
Martin

(10) Patent No.: US 7,051,500 B2
(45) Date of Patent: May 30, 2006

(54) ATV MOWER DECK ADAPTER

(76) Inventor: John Gregory Martin, 171 County Rd. SW., Marietta, GA (US) 30064

( * ) Notice: Subject to any disclaimer, the term of this patent is extended or adjusted under 35 U.S.C. 154(b) by 0 days.

(21) Appl. No.: 10/999,647

(22) Filed: Nov. 10, 2004

(65) Prior Publication Data

US 2006/0075733 A1    Apr. 13, 2006

Related U.S. Application Data

(60) Provisional application No. 60/617,350, filed on Oct. 12, 2004.

(51) Int. Cl.
*A01F 34/64* (2006.01)

(52) U.S. Cl. .................................. 56/14.9; 56/DIG. 14
(58) Field of Classification Search ................. 56/14.7, 56/14.9, 255, 295, 1, DIG. 14
See application file for complete search history.

(56) References Cited

U.S. PATENT DOCUMENTS

| | | | | |
|---|---|---|---|---|
| 4,577,712 A | * | 3/1986 | Foote et al. | 180/53.4 |
| 5,381,647 A | * | 1/1995 | Eberle | 56/15.8 |
| 5,938,395 A | * | 8/1999 | Dumont, Jr. | 414/462 |
| 6,178,668 B1 | * | 1/2001 | Gustafson et al. | 37/231 |
| 6,557,330 B1 | * | 5/2003 | Hubscher | 56/10.8 |
| 6,732,811 B1 | * | 5/2004 | Elliott | 172/445.1 |

* cited by examiner

*Primary Examiner*—Meredith Petravick

(57) ABSTRACT

An adjustable (height, angle, and width) adapter which is attached to a gas powered mower deck and is supported by the front or back rack of a self-propelled, motorized, all-terrain vehicle. The adjustments enable application with various-sized mower decks. The ATV Mower Deck Adapter eliminates the need for the mower unit to have wheels. ATV Mower Deck Adapter further provides for height and angle adjustment to accommodate the terrain and avoid objects on the ground or protruding from the ground.

1 Claim, 4 Drawing Sheets

ATV MOWER DECK ADAPTER

This appln. claims the benefit of Provisional Application No. 60/617,350 filed on Oct. 12, 2004.

BACKGROUND OF INVENTION

The present application is to enable the use of a mower deck, motor, and blade while attached to a self-propelled, motorized, all-terrain vehicle (hereinafter ATV) via an adjustable carriage so the height and angle of the deck can be changed whether mounted on the front or back of an ATV.

Prior to the creation of this carriage, ATV mower applications have either been decks underneath the ATV, pull-behind decks that have their own wheels, or front-mounted with an articulating hitch.

This carriage eliminates the need for the mower unit to have wheels and further provides for height and angle adjustment to accommodate the terrain and objects on the ground or protruding from the ground.

BRIEF SUMMARY OF INVENTION

This invention permits an ATV operator to use a mower deck for multiple purposes. This would include (but not be limited to) cutting normal yard grass, but also permit use in rough terrain, which has objects on the ground or protrusions from the ground that the height and angle of the deck can be adjusted for terrain height of obstructions.

ATV Mower Deck Adapter

An adjustable (height, angle, and width) adapter which is attached to a gas-powered mower deck and is supported by horizontal arms fastened to the front or back rack of a self-propelled, motorized, all-terrain vehicle (hereinafter ATV). The rear lower portion of the mower deck is supported by an adjustable arm, which can be mounted to the undercarriage of the ATV.

Use of Invention

Permits the operator of an ATV to cut foliage and other ground cover at various height settings depending upon the terrain and objects either on or protruding up from the ground.

DETAILED DESCRIPTION OF THE INVENTION

As required, detailed embodiments of the present invention are disclosed herein; however it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present inventions in virtually any appropriately detailed structure.

Figure 1:
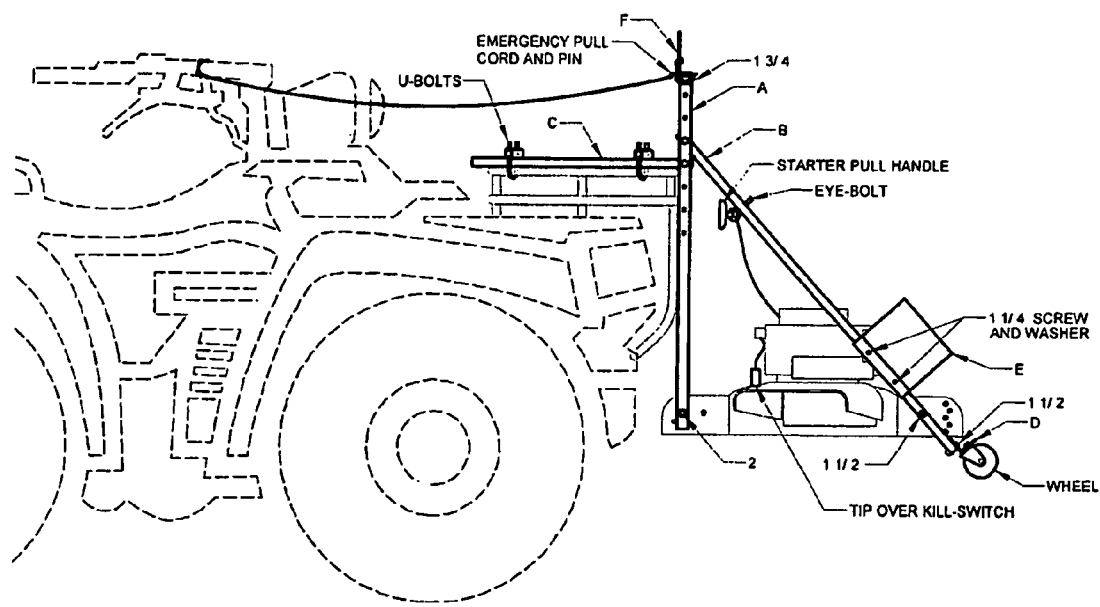
FIGS. 1 and 2 is a side view of an all-terrain vehicle with the self-powered mower deck attached thereto by the ATV Mower Deck Adapter in accordance with the present invention.

The present invention is directed to an adjustable ATV mower deck adapter designated by a drawing (FIG. 1) having an ATV and a mower deck which are connected via an adjustable ATV mower deck adapter, which provide for height and angle adjustment and further an adjustment to accommodate various sizes of mower decks, which includes the width and length of the deck.

In accordance with the present invention, the ATV may be any of the conventional vehicles of this type, which have sufficient power and weight capacity to carry the invention.

The mower deck may be custom-constructed for the apparatus; however, conventionally available mower decks may be suitable for use with the invention, as the width and length of the carriage can be adjusted to accommodate most conventionally available mower decks. The mower deck includes housing and an independent gasoline-consuming motor that is connected to either one or two mower blades. The mower engine will have installed a tip-over engine kill switch.

Figure 2:
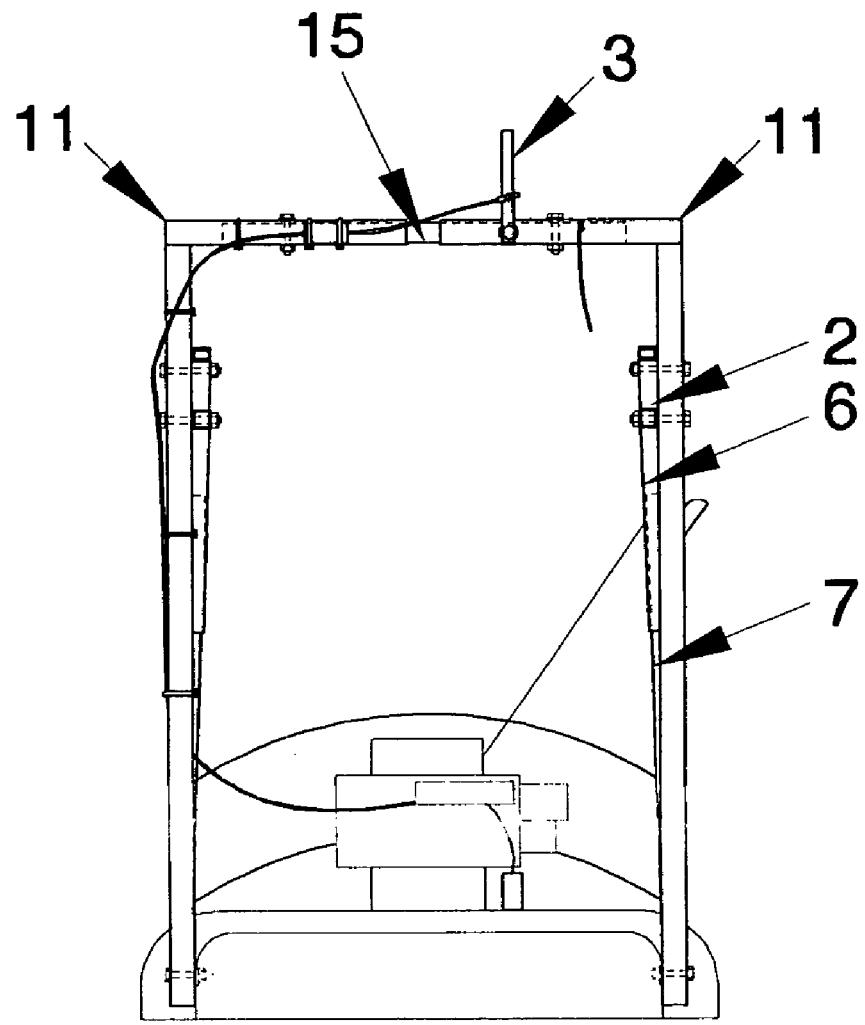
Figure 3:
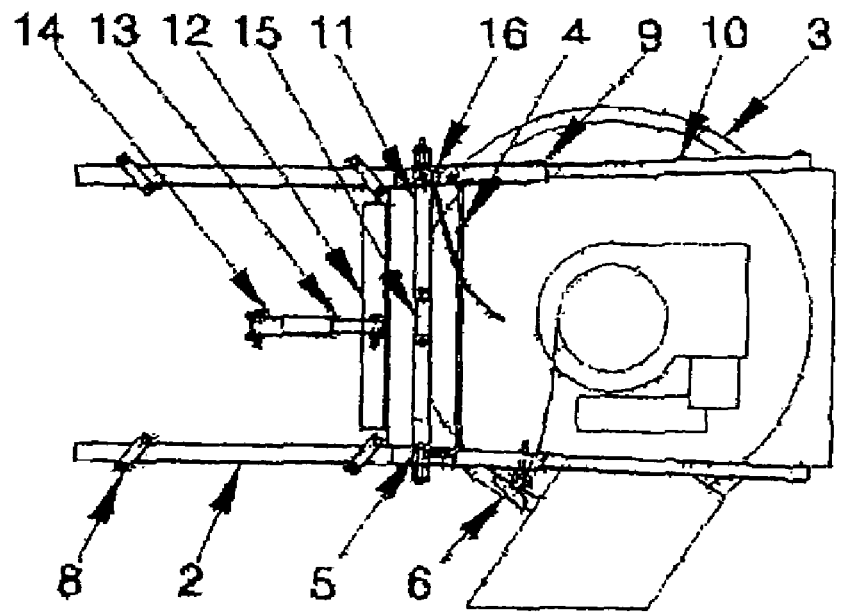
FIG. 3 is an overhead view of the ATV Mower Deck Adapter and the self-powered mower deck in accordance with the invention.
Figure 4:
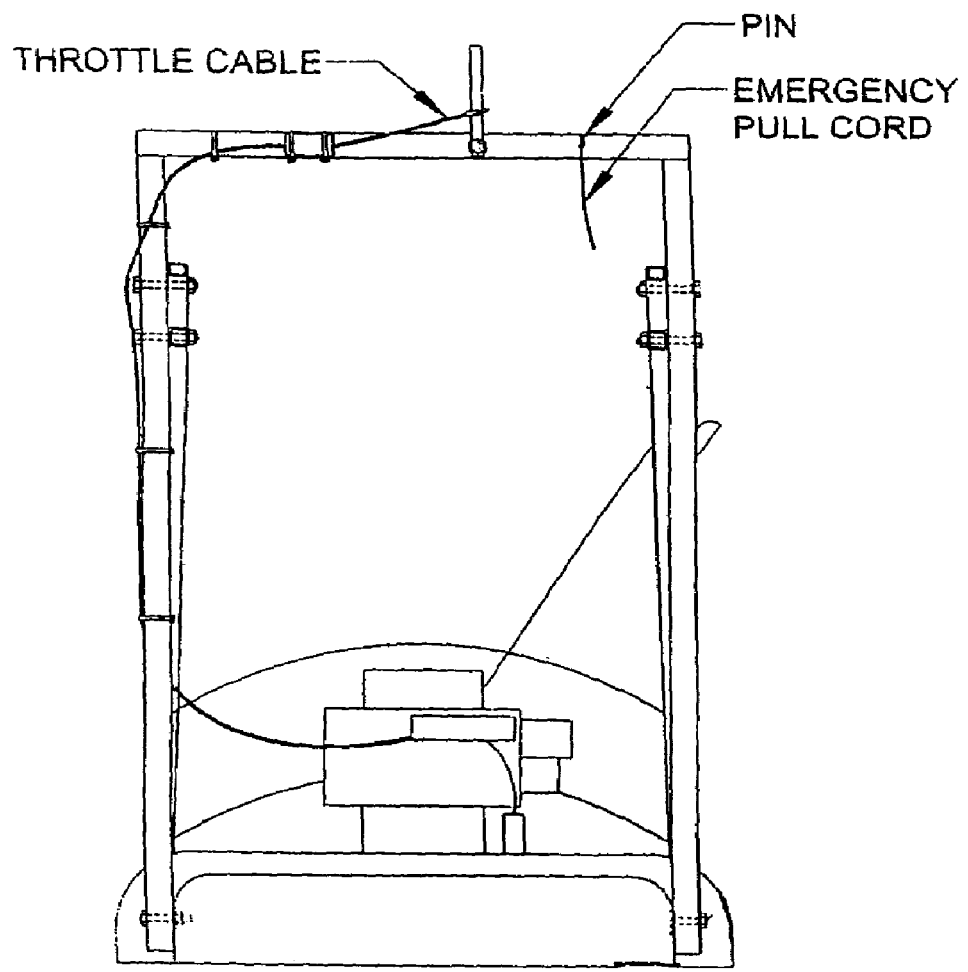
FIG. 4 is a rear view of the ATV Mower Deck Adapter and self-powered mower deck in accordance with the invention.

See FIGS. 2 and 3 for numerical parts reference.

The upper portion of the ATV (#1) mower deck adapter provides locations for the mower motor cut-off (#4) and also has a pull pin which stops the engine.

Diagonal support of the mower deck is provided by metal tubing (#6) which has inserted into it (#7). The diagonal (#6 and #7) have positioned apertures so that adjustment is available to accommodate various sized mower decks. Once adjusted a bolt with nut locks it into position. The diagonal support is bolted to the U section (#11) and to the forward section of the mower base. An eyebolt is used on either side of (#6) to accommodate the pull cord of the mower motor. The U section (#11) is inverted in that the horizontal portion is at the top of the carriage.

The primary weight of the unit is supported by (#2), which is bolted through the U. The U has numerous apertures to augment with (#2) so that the height of the base can be adjusted. The opposite end of (#2) is extended over the front or rear rack of the ATV and fastened via a U-Bolt's or similar hardware. The mower cut-off cable is mounted on the upper (horizontal) portion of the U and continues to the cutoff handle. The handle (#4) is locked or unlocked via a pin with pull cord which passes through the upper portion of the U.

The horizontal portion of the U is adjustable by use of an inserted metal tube (#15). The horizontal portion of the U and the inserted metal tube (#15) have correspondingly spaced and positioned apertures so that the width of the vertical metal tubes can be adjusted to accommodate various widths of mower decks. Once positioned, bolts going through the horizontal metal tube and insert, locking the U section into on piece. This piece is then bolted to the rear portion of the mower deck.

On the rear of the mower deck is bolted (#14), which has a U-shaped metal attached to the center of (#12) facing to the rear of the mower deck. A similar U is attached to either the front lower portion of the ATV or the rear trailer hitch. Between these two U's are two pieces of metal tubing, one of which inserts into the larger tubing. This tubing has aligned apertures to adjust the distance and the locked-into position by use of a bolt. The ends of the tubing fit inside the two U brackets affixed to the ATV frame and the rear of the mower deck. A bolt is placed through the aligned holes, which also allows the ends of (#12 & #14) to pivot.

At the end of the diagonal braces (#7) at the front of the mower deck is mounted a metal bar which is attached to each diagonal brace and with a swivel wheel mounted in the center of the metal bar. This permits the unit to rotate in an upward direction (pivots at the intersection of the diagonal (#6) and the U (#11) due to the rise of the earth.

The invention claimed is:

1. A mower deck attached to an all-terrain-vehicle comprising:
   A. an all-terrain-vehicle having a rack mounted on the front;
   B. a mower deck having a housing with first and second sides, at least one blade, an engine and an engine cut-off cable, the mower deck not having wheels; and
   C. a carriage adjustably attaching the mower deck to the all-terrain-vehicle, the carriage including:
      i. an inverted u-shaped frame having:
         a. a top horizontal tubular member having a first end and a second end, the top horizontal tubular member being formed from two metal tubes, one tube being inserted in the other, both tubes having a plurality of apertures so that bolts inserted through two aligned apertures adjust the width of the top horizontal tubular member,
         b. a first vertical tubular leg having a top end, a bottom end and a plurality of apertures near the top end, and
         c. a second vertical tubular leg having a top end, a bottom end and a plurality of apertures near the top end,
         wherein the top end of the first vertical tubular leg is attached to the first end of the top horizontal tubular member, the top end of the second vertical tubular leg is attached to the second end of the top horizontal tubular member forming the u-shaped frame;
      ii. first and second diagonal supports each having upper and lower ends, the first and second diagonal supports each being formed from two metal tubes, each diagonal support having one tube being inserted in the other, the tubes having a plurality of apertures so that bolts inserted through two aligned apertures adjust the length of each diagonal support,
         wherein the upper end of the first diagonal support is attached to a selected one of the plurality of apertures near the top end of the first vertical leg by a bolt, the upper end of the second diagonal support is attached to a selected one of the plurality of apertures near the top end of the second vertical leg by a bolt, whereby selecting different apertures from the plurality of apertures near the top end of the vertical legs accommodates different sized mower decks;
      iii. a cross brace attached to the lower ends of the first and second diagonal supports, the cross brace having a swivel wheel mounted at the center;
      iv. first and second horizontal supports, the first and second horizontal supports each having a first and second end
         wherein the first end of the first horizontal support is attached to a selected one of the plurality of apertures near the top end of the first vertical tubular leg by a bolt, the first end of the second horizontal support is attached to a selected one of the plurality of apertures near the top end of the second vertical tubular leg by a bolt, whereby selecting different apertures from the plurality of apertures near the top end of the vertical legs adjusts the height of the mower deck;
      v. a curved metal shroud, a first end of the curved metal shroud being attached to the first diagonal support, a second end of the curved metal shroud being attached to the second diagonal support, the curved metal shroud is positioned in front of the engine; and
      vi. a cut-off handle pivotally attached to the top horizontal tubular member, the cut-off handle being attached to the engine cut-off cable, a pin locking the cut-off handle to the top horizontal tubular member so that the cut-off handle does not pivot, a pull cord extending from the pin so that an operator on the all-terrain-vehicle can pull on the pin and unlock the cut-off handle allowing the cut-off handle to pivot;
   wherein the bottom end of the first vertical tubular leg is attached to the first side of the mower deck by a bolt, the bottom end of the second vertical tubular leg is attached to the second side of the mower deck by a bolt;
   wherein the first diagonal support near the lower end is attached to the first side of the mower deck housing by a bolt, the second diagonal support near the lower end is attached to the second side of the mower deck housing by a bolt; and
   wherein the second end of the first horizontal support is attached to the rack of the all-terrain-vehicle by a u-bolt, the second end of the second horizontal support is attached to the rack of the all-terrain-vehicle by a u-bolt.

* * * * *